Dec. 15, 1953

F. FORT ET AL 2,662,500

MACHINE FOR WIPING IN HARDENED
INSERTS FOR ROCK DRILL BITS

Filed July 9, 1949

INVENTORS:
Frank Fort,
Eugene C. Krug,
By Carr & Carr & Gravely
THEIR ATTORNEYS.

Dec. 15, 1953   F. FORT ET AL   2,662,500
MACHINE FOR WIPING IN HARDENED
INSERTS FOR ROCK DRILL BITS
Filed July 9, 1949                                 2 Sheets-Sheet 2

INVENTORS:
Frank Fort
Eugene C. Krug,
By Carr & Carr & Gravely
THEIR ATTORNEYS.

Patented Dec. 15, 1953

2,662,500

UNITED STATES PATENT OFFICE 2,662,500

MACHINE FOR WIPING IN HARDENED INSERTS FOR ROCK DRILL BITS

Frank Fort and Eugene C. Krug, Canton, Ohio, assignors to The Timken Roller Bearing Company, Canton, Ohio, a corporation of Ohio Application July 9, 1949, Serial No. 103,868

4 Claims. (Cl. 113—59)

This invention relates to machines for making cutting tools and is more particularly directed to a machine for wiping in hardened inserts for rock drill bits or similar tools so that the inserts may be soldered in the body of the drill bit. In the manufacture heretofore of rock drill bits the body of the bit was suitably slotted and inserts brazed or soldered into their respective slots by hand which resulted in poor bonding and non-uniform location of the inserts. In the instant invention the slots are filled with a suitable solder and the inserts reciprocated in the slots while the solder is in molten condition, thereby wiping in the inserts and resulting in a tighter bond and more accurate location of the inserts in the slots.

One of the objects of the invention is to provide a machine for wiping in hardened inserts for rock drill bits or similar cutting tools in which all of the inserts are simultaneously and uniformly actuated during the wiping operation.

Another object of the invention is to provide a machine for wiping in hardened inserts for cutting tools, such as rock drill bits, in which the machine part for actuating the inserts is movable vertically for lifting it bodily from the cutting tool being operated on for permitting installation of the cutting tool or removal thereof from the machine.

The invention consists in the provision of a machine having a base provided with a column and lifting means for the tool insert wiping mechanism that is vertically movable on the column, the column having cam tracks therein for bodily rotating the wiping mechanism as it is vertically moved, the cam tracks being so positioned that when the wiping mechanism is moved to its lowermost position it will be centered on a rock drill bit held in position on the machine base.

The invention also consists in the provision of an insert wiping mechanism for cutting tools in which manually operable insert reciprocating means engage the inserts for simultaneously and uniformly wiping all cutting tool inserts.

Figure 1:
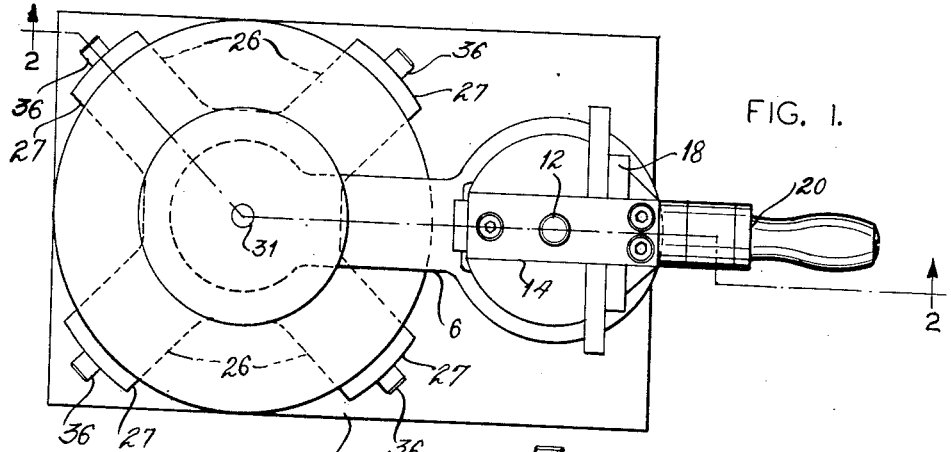
Fig. 1 is a plan view of the machine.
Figure 2:
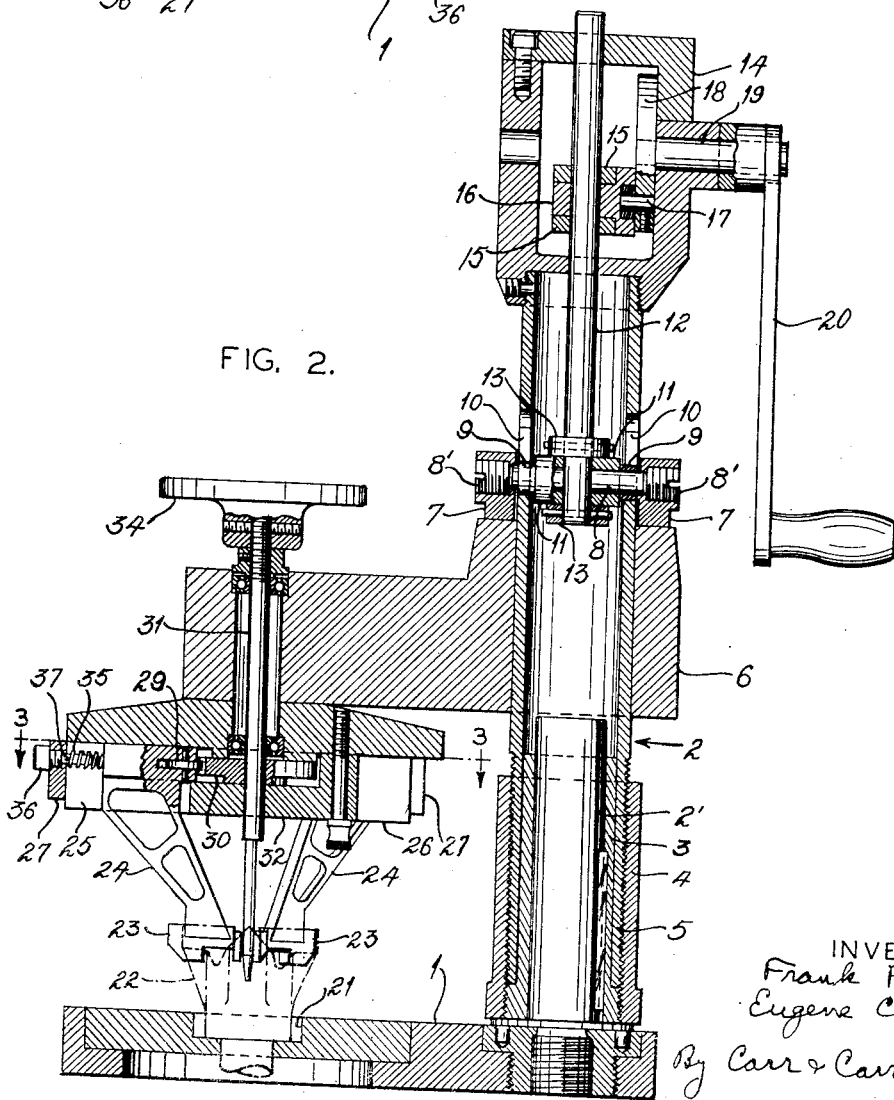
Fig. 2 is a vertical sectional view taken substantially along the line 2—2 of Fig. 1.

The invention is embodied in the machine shown in the several views of the drawings in which the numeral 1 designates a machine base on which column 2 is erected, the post 2' of the column being threaded into the base 1. The column consists of a tubular bushing 3 to which a tubular member 4 is threaded. A second tubular member 5 is concentrically arranged with respect to the tubular bushing 3 and tubular member 4. The tubular member 4 is threaded to bushing 3 and member 5 is threaded to member 4 in order that member 5 may be vertically adjusted with respect to base 1. The post 2' is keyed to member 3, thereby securely holding the column in position.

Figure 4:
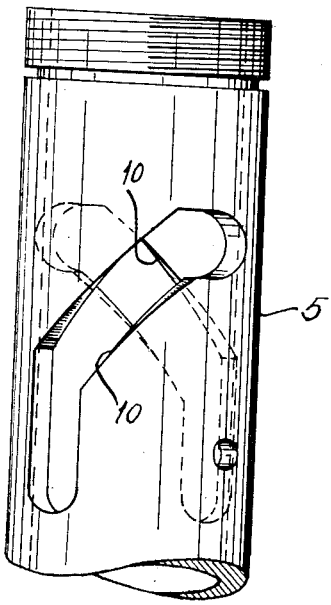
Fig. 4 is an elevational view of a portion of the machine column showing constructions details.
Figure 3:
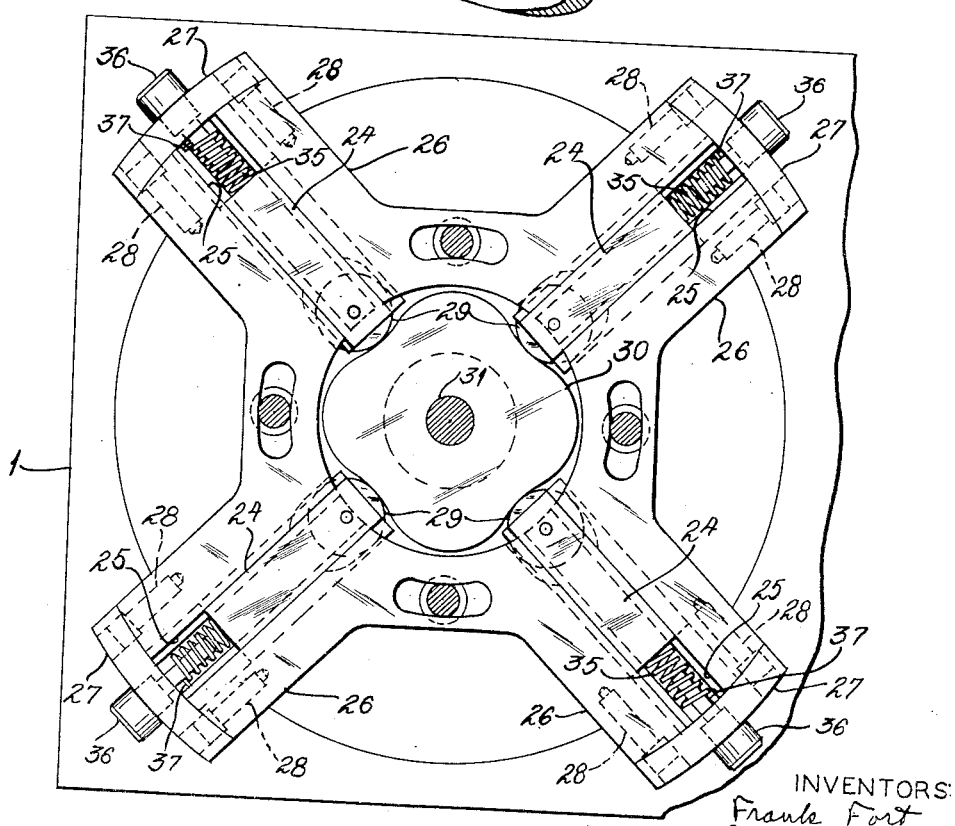
Fig. 3 is a sectional view taken substantially along the line 3—3 of Fig. 2.

A radial arm support 6 for the wiping in mechanism is vertically slidable and rotatable about the tubular member 5. The radial arm 6 is provided with a pair of brackets 7 diametrically disposed with respect to the tubular member 5. A pin 8 is supported in brackets 7, being held in the brackets by suitable plugs 8'. A pair of rollers 9 is rotatably supported on pin 8 and disposed in cam track slots 10 cut into the wall of the tubular member 5 (Fig. 4). These cam track slots are transversely disposed so that when pin 8 is moved vertically, the radial arm 6 will be rotated about the tubular member 5. Suitable dwells are cut into the cam tracks so that the pin 8 will be held in position at both ends of its vertical travel.

Spacers 11 are mounted on pin 8 and hold the rollers 9 in the cam tracks. A rod 12 is disposed between the spacers 11 and held in pin 8 by pinned washers 13, there being one disposed on each side of spacers 11. The rod 12 projects upwardly into housing 14 threaded to the upper end of tubular member 5. A pair of collars 15 is secured to the rod between which an eccentric follower or slide 16 is disposed. A pin 17 is received in the slide or follower 16 and is secured to a disc 18. This disc is secured to a shaft 19 rotatably mounted in housing 14 and a handle 20 is attached to the shaft for rotating same. Rotation of shaft 19 by the handle 20 will rotate disc 18, thereby vertically moving rod 12 and lifting the radial arm 6, said radial arm being also rotatable about the tubular member 5 by reason of the interengagement of pin 8 with the cam track slots 10.

The base 1 has an aperture 21 therein in which a rock drill bit 22 is received. The rock drill bit is equipped with a plurality of hardened inserts disposed in suitable slots in the body of the bit. During the assembly process of soldering the inserts into the bit, they are moved relatively thereto while the solder is in a molten condition. The drill bit is heated by an induction coil (not shown) in order that the solder may remain in a molten state so that the bond will be uniform and tight as the inserts are moved relatively to the body, or are wiped in.

Each of the inserts is engaged by a shoe 23 secured to the lower ends of cam follower arms 24. The upper ends of the cam follower arms are slidably received in slots 25 formed in cam plate 26. The outer ends of the slots are closed by a suitably shaped retaining member 27 secured to the plate by screws 28. The instant illustration shows four arms 24, although any number of arms may be employed. The cam follower arms are each provided with a roller 29 rotatably supported therein. These rollers are engaged by a cam 30 secured to a shaft 31. The shaft 31 is rotatably supported in radial arm 6 and extends through a holding member 32 clamped to the cam plate 26 by means of screws 33, the cam 30 being disposed between the holding member 32 and the cam plate 26. The shaft 31 is provided with a hand-wheel 34, whereby cam 30 is rotated so that the cam follower arms 24 may be moved in the tracks in cam plate 26, thereby moving the inserts in the rock drill bit relative to the body thereof for wiping in the inserts. The roller 29 is urged into engagement with cam 30 by spring 35 whose tension is adjusted by screws 36, the pin 37 on screws 36 holding the spring 35 in position. The spring 35 imposes return movement on the cam follower arm 24 and the roller after cam 30 has moved them radially outwardly.

Gas bubbles that frequently form in the solder are removed therefrom by the spring action and jar from the cam action of the device. These flux gas bubbles are broken by the actions referred to, thereby permitting the escape of gas to atmosphere and improving the quality of the bond.

What we claim is:

1. A machine for wiping in hardened inserts in cutting tools comprising a base for supporting the slotted body of the cutting tool in which a plurality of inserts are to be installed, a column having cam tracks therein and supported in said base, an arm engageable with each insert, means for supporting said arms and disposed on said column, means for simultaneously actuating each arm in said supporting means, means for vertically moving said supporting means; and cam follower means associated with said supporting means and engageable with said cam tracks for rotating said supporting means relative to said column as said supporting means is moved vertically.

2. A machine for wiping in hardened inserts in cutting tools comprising a base for said machine having means therein for receiving the slotted body of a cutting tool, the inserts being installed in the slots in said body, a column supported in said base having cam tracks cut therein, an arm engageable with each insert, means for supporting said arms and disposed on said column, a cam moving said arms in said supporting means in one direction, means for rotating said cam, means for maintaining each of said arms in engagement with said cam and for reversely moving said arms, means for vertically moving said supporting means; and cam follower means in engagement with said cam tracks for rotating said supporting means on said column as said supporting means is moved vertically.

3. A machine for wiping in hardened inserts in cutting tools comprising a base for supporting the slotted body of the cutting tool in which a plurality of inserts are to be installed, a column having cam tracks therein and supported in said base, an arm engageable with each insert, means for supporting said arms and disposed on said column, means for simultaneously radially moving each arm toward and away from the longitudinal axis of the cutting tool in said supporting means, means for vertically moving said supporting means; and cam follower means associated with said supporting means and engageable with said cam tracks for rotating said supporting means relative to said column as said supporting means is moved vertically.

4. A machine for wiping in hardened inserts in cutting tools comprising a base for said machine having means therein for receiving the slotted body of a cutting tool, the inserts being installed in the slots in said body, a column supported in said base having cam tracks cut therein, an arm engageable with each insert, means for supporting said arms and disposed on said column, a cam for moving said arms in said supporting means radially outwardly with respect to the longitudinal axis of the cutting tool, means for rotating said cam, means for maintaining each of said arms in engagement with said cam and for moving said arms radially inwardly, means for vertically moving said supporting means; and cam follower means in engagement with said cam tracks for rotating said supporting means on said column as said supporting means is moved vertically.

FRANK FORT.
EUGENE C. KRUG.

References Cited in the file of this patent

UNITED STATES PATENTS

| Number | Name | Date |
| --- | --- | --- |
| 150,887 | Perkins | May 12, 1874 |
| 1,470,687 | Clarke | Oct. 16, 1923 |
| 1,764,271 | Leonard | June 17, 1930 |
| 1,816,610 | Persons | July 28, 1931 |
| 1,879,908 | Moon | Sept. 27, 1932 |
| 2,105,762 | Zimmerman | Jan. 18, 1938 |
| 2,142,057 | Hulbert | Dec. 27, 1938 |
| 2,474,368 | Howlett | June 28, 1949 |